United States Patent
Zhu et al.

(10) Patent No.: US 8,049,985 B2
(45) Date of Patent: Nov. 1, 2011

(54) VARIABLE SPINDLE SPEED CONTROL FOR DATA STORAGE DEVICES

(75) Inventors: Hong Zhu, Bloomington, MN (US); Peng Yan, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/364,952

(22) Filed: Feb. 3, 2009

(65) Prior Publication Data
US 2010/0195243 A1 Aug. 5, 2010

(51) Int. Cl.
G11B 15/46 (2006.01)
G11B 19/02 (2006.01)

(52) U.S. Cl. ........................ 360/73.03; 360/69

(58) Field of Classification Search .................. None
See application file for complete search history.

(56) References Cited

U.S. PATENT DOCUMENTS

| | | | |
|---|---|---|---|
| 4,710,825 A | 12/1987 | Okita et al. .................. 358/342 |
| 4,864,428 A | 9/1989 | Kanamaru .................. 358/342 |
| 5,412,519 A | 5/1995 | Buettner et al. ............ 360/73.03 |
| 5,422,768 A | 6/1995 | Roehling et al. ........... 360/98.08 |
| 5,521,896 A | 5/1996 | Bajorek et al. ................. 369/54 |
| 5,528,574 A | 6/1996 | Takeuchi et al. ............... 369/50 |
| 5,589,996 A | 12/1996 | Patrick et al. .............. 360/73.03 |
| 5,631,999 A | 5/1997 | Dinsmore ..................... 388/805 |
| 5,633,568 A | 5/1997 | Dunfield ..................... 318/254 |
| 5,659,799 A | 8/1997 | Wu et al. ..................... 395/877 |
| 5,684,703 A | 11/1997 | Itoh et al. ..................... 364/443 |
| 5,701,284 A | 12/1997 | Lee ................................. 369/50 |
| 5,764,430 A | 6/1998 | Ottesen et al. ............. 360/73.03 |
| 5,901,009 A | 5/1999 | Sri-Jayantha et al. ..... 360/78.07 |
| 5,982,570 A | 11/1999 | Koizumi et al. ................ 360/69 |
| 6,067,203 A * | 5/2000 | Ottesen et al. ............. 360/73.03 |
| 6,075,665 A * | 6/2000 | Chainer et al. ................. 360/48 |
| 6,078,458 A | 6/2000 | Fioravanti et al. ......... 360/73.03 |
| 6,104,153 A | 8/2000 | Codilian et al. ............. 318/362 |
| 6,104,566 A | 8/2000 | Stephenson ................ 360/73.03 |
| 6,151,182 A | 11/2000 | Koizumi et al. ................ 360/69 |
| 6,411,457 B2 | 6/2002 | Yamashita et al. ......... 360/73.03 |
| 6,493,169 B1 | 12/2002 | Ferris et al. ................ 360/73.03 |
| 6,603,719 B1 | 8/2003 | Wu |
| 6,628,470 B1 | 9/2003 | Fujimori .................... 360/73.03 |
| 6,710,567 B2 | 3/2004 | Heydt et al. .................. 318/560 |
| 6,741,414 B1 | 5/2004 | Boyd et al. ................. 360/73.03 |
| 6,753,667 B2 | 6/2004 | Sakamoto .................... 318/433 |
| 6,989,953 B1 | 1/2006 | Codilian .................... 360/73.03 |
| 7,002,884 B2 | 2/2006 | Schmidt et al. ............ 369/47.38 |
| 7,068,577 B2 | 6/2006 | Uehigashi .................. 369/53.22 |
| 7,088,542 B2 | 8/2006 | Kang ......................... 360/73.03 |
| 7,136,248 B2 | 11/2006 | Tanner ....................... 360/73.03 |
| 7,301,867 B2 | 11/2007 | Bahng ........................ 369/47.38 |

(Continued)

OTHER PUBLICATIONS

Notification of Transmittal of the International Search Report and the Written Opinion from international application No. PCT/US2010/023051, dated Apr. 15, 2010.

*Primary Examiner* — Andrew L Sniezek
(74) *Attorney, Agent, or Firm* — David K. Lucente

(57) ABSTRACT

In a particular embodiment, a system is disclosed that includes a solid-state data storage medium, a disc data storage medium, and a controller adapted to selectively adjust a spindle speed associated with the disc data storage medium and a buffer size associated with the solid-state data storage medium responsive to a trigger.

8 Claims, 9 Drawing Sheets

U.S. PATENT DOCUMENTS

| | | |
|---|---|---|
| 7,339,862 B2 | 3/2008 | Takenaka .................... 369/47.41 |
| 2004/0017630 A1 | 1/2004 | Akagi |
| 2005/0141375 A1 | 6/2005 | Ehrlich et al. ............. 369/47.38 |
| 2005/0146806 A1 | 7/2005 | Koizumi et al. ................ 360/69 |
| 2008/0049354 A1 | 2/2008 | Nitta |
| 2008/0259488 A1 | 10/2008 | Kang |

* cited by examiner

VARIABLE SPINDLE SPEED CONTROL FOR DATA STORAGE DEVICES

FIELD

The present invention relates generally to variable spindle speed control for data storage devices, and more particularly but not by limitation to a hybrid data storage device including at least two data storage media and including a controller to selectively apply a selected operating mode having a particular spindle speed associated with at least one of the two data storage media.

DETAILED DESCRIPTION OF ILLUSTRATIVE EMBODIMENTS

In a particular embodiment, a hybrid data storage device is disclosed that includes a hard disc data storage medium and a solid-state data storage medium (such as a non-volatile flash storage medium). In a particular embodiment, a spindle speed (or rate) associated with the hard disc data storage medium plays a significant role in input/output (I/O) performance for the data storage device. External disturbance (windage and disc modes) is highly dependent on the spindle speed, which is also one of the gating factors for a real density and performance of the hard disc data storage medium. While some hard disc data storage devices utilize a fixed spindle rotation speed to deliver a desired performance and handle induced external disturbances for the particular spindle speed, a controller of the hybrid storage device is adapted to selectively utilize variable spindle rates to improve reliability and reduce power consumption in response to input data. The input data can include user input data received from a host system via an interface, external disturbance data related to one or more environmental sensors, performance data from one or more firmware sensors, or any combination thereof. Further, the hybrid data storage device can utilize the solid-state data storage medium to provide a large data buffer/cache to maintain desired performance, even when the spindle speed is reduced.

Figure 1:
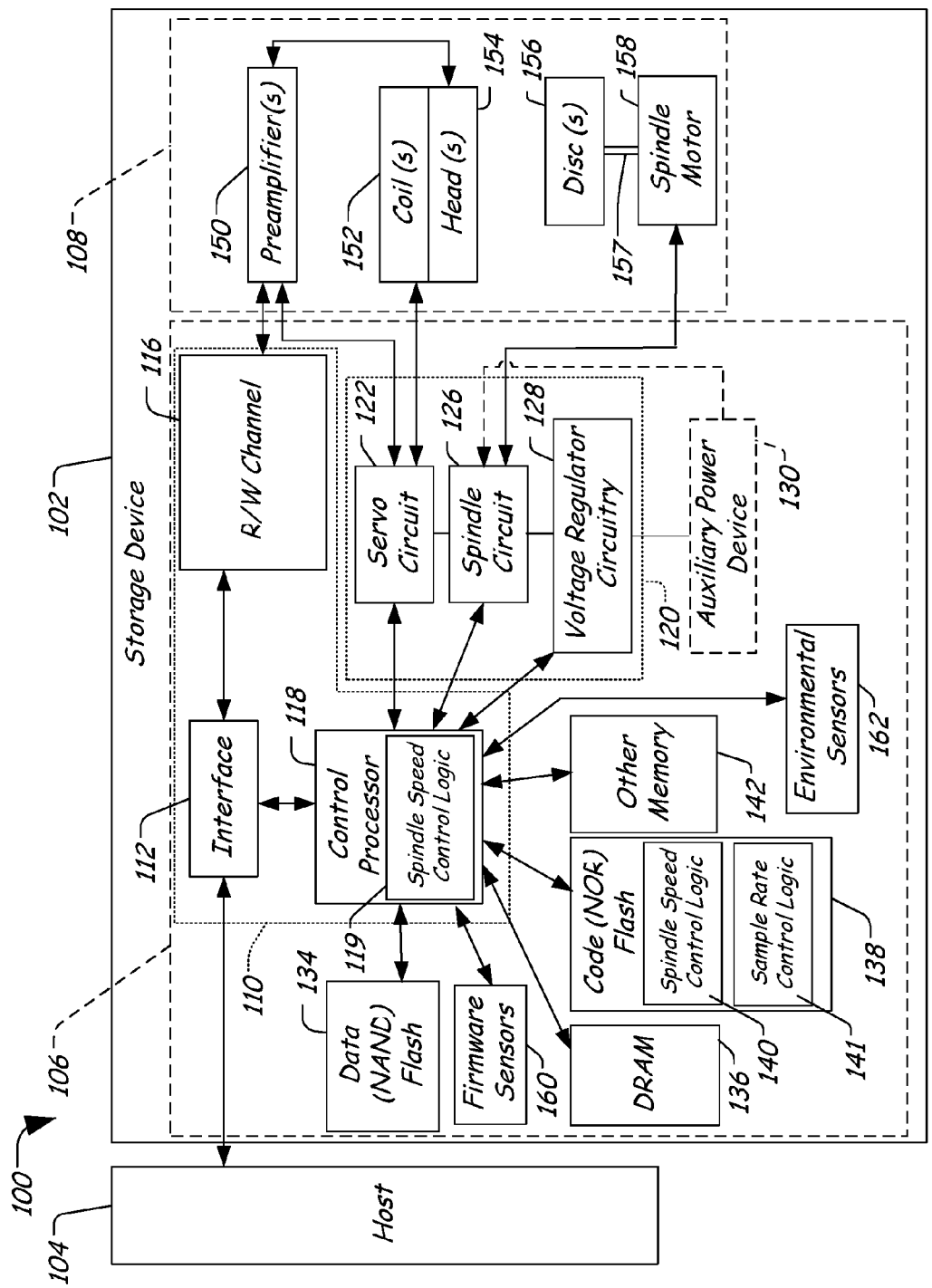
FIG. 1 is a block diagram of a particular illustrative embodiment of a system including a hybrid storage device adapted to control a variable spindle speed.

FIG. 1 is a block diagram of a particular illustrative embodiment of a system 100 including a hybrid storage device 102 adapted to provide a variable spindle speed. As used herein, the term "hybrid storage device" refers to a data storage device that includes both a rotating storage medium (hard disc data storage medium) and a second data storage medium, such as a solid-state storage medium. The hybrid storage device 102 is adapted to communicate with a host system 104. In a particular embodiment, the host system 104 can be a computer, a processor, a personal digital assistant (PDA), a portable telephone, another electronic device, or any combination thereof.

The hybrid storage device 102 includes recording subsystem circuitry 106 and a head-disc assembly 108. The recording subsystem 106 includes storage device read/write control circuitry 110 and disc-head assembly control circuitry 120. The recording subsystem circuitry 106 includes an interface circuit 112, which has a data buffer for temporarily buffering the data and a sequencer for directing the operation of the read/write channel 116 and the preamplifier 150 during data transfer operations. Further, the hybrid storage device 102 can utilize a portion of a solid-state data storage device, such as a data flash memory 134, as a data buffer, which has a data buffer size that can be adjusted. The interface circuit 112 is coupled to the host system 104 and to a control processor 118, which is adapted to control operation of the hybrid storage device 102. In a particular embodiment, the control processor 118 includes spindle speed control logic 119 that is adapted to control a spindle circuit 126 and a spindle motor 158 to adjust a rotational velocity (spindle speed or rotations per minute (RPM)) associated with one or more rotatable discs 156. In a particular embodiment, the spindle speed control logic 119 can include processor executable instructions that are executed by the control processor 118. The storage device 102 may include firmware sensors 160 to monitor bit error rate, read retry rates, other parameters, or any combination thereof that are associated with performance of the storage device 102. Further, the storage device 102 can include one or more environmental sensors 162 to monitor external disturbances and environmental parameters. The one or more sensors 162 can include shock events, vibrations sensors, temperature sensors, other sensors, or any combination thereof.

In a particular embodiment, the control logic 119 can receive input data including at least one of a user input (such as user data or instructions received from the host system 104 via the interface 112), environmental data from an environmental sensor (such as one or environmental sensor 162), performance parameter data from firmware sensors (such as one or more firmware sensors 160), or any combination thereof. Further, the control logic 119 can selectively adjust a spindle speed of the spindle 157 and a sampling rate associated with the one or more read/write heads 154 based on the received input data, to enable reading and writing data from and to the one or more discs 156 at the altered spindle speed. Further the control logic 119 is adapted to adjust a size of a data buffer within a solid-state memory, such as the data flash 134.

The control processor 118 is coupled to a servo circuit 122 that is adapted to control the position of the one or more read/write heads 154 relative to the one or more discs 156 as part of a servo loop established by the one or more read/write heads 154. In a particular embodiment, the servo circuit 122 is adapted to control a fly height, pitch and roll associated with the one or more read/write heads 154, which are mounted to a respective one or more sliders having aerodynamic profiles for flying above the surfaces of the one or more discs 156. The one or more read/write heads 154 are mounted to a slider that is coupled to a rotary actuator assembly to which a coil 152 of a voice coil motor (VCM) is attached. The VCM includes a pair of magnetic flux paths between which the coil 152 is disposed so that the passage of current through the coil causes magnetic interaction between the coil 152 and the magnetic flux paths, resulting in the controlled rotation of the actuator assembly and the movement of the one or more read/write heads 154 relative to the surfaces of the one or more rotatable discs 156. The servo circuit 122 is used to control the application of current to the coil 152, and hence the position of the one or more read/write heads 154 with respect to the tracks of the one or more rotatable discs 156.

The disc-head assembly control circuitry 120 includes the servo circuit 122 and includes the spindle circuit 126 that is coupled to the spindle motor 158 to control the rotation of the one or more discs 156. The disc-head assembly control circuitry 120 further includes voltage regulator circuitry 128 that controls a power supply to the spindle motor 158 via the spindle circuit 126. The hybrid storage device 102 also includes an auxiliary power device 130 that is coupled to the disc-head assembly control circuitry 120 and that is adapted to operate as a power source when power to the hybrid storage device 102 is lost. In a particular embodiment, the auxiliary power device 130 can be a capacitor or a battery that is adapted to supply power to the hybrid storage device 102 under certain operating conditions. In a particular example, the auxiliary power device 130 can provide a power supply to the recording subsystem assembly 106 and to the disc-head assembly 108 to record data to the one or more rotatable discs 156 when power is turned off. In a particular embodiment, the auxiliary power device 130 is adapted to supply power to the spindle motor 158 via the spindle circuit 126 to increase the spindle speed if power is lost during an unload operation. Further, the auxiliary power device 130 may supply power to the recording subsystem assembly 106 to record data to a data flash 134 or to a code flash 138 when power is turned off.

Additionally, the hybrid storage device 102 includes the data flash 134 (such as a NAND flash memory), a dynamic random access memory (DRAM) 136, the code flash 138 (such as a NAND or NOR flash memory), other memory 142, or any combination thereof. In a particular embodiment, the code (NOR) flash 138 stores spindle speed control logic instructions 140, which can be loaded and executed by the control processor 118.

In a particular illustrative embodiment, the code (NOR) flash 138 is a solid-state memory that stores operating instructions (including spindle speed control logic instructions 140) that are executable by the control processor 118 to control the variable speeds via the spindle circuit 126 and the spindle motor 158 and to control operation of the actuator assembly, including the servo circuit 122, the coils 152 and the read/write heads 154.

In a particular embodiment, the spindle speed control logic 119 is executed by the control processor 118 in response to a trigger, such as a user input received from the host system 104 via the interface 112 to select an operating mode from a plurality of operating modes. In a particular example, the plurality of operating modes can include a "normal" operating mode, a "safe" operating mode, a "voice" operating mode, an "audio" operating mode, a "video" operating mode, other modes, or any combination thereof. In this particular example, the "normal" operating mode can refer to performance and operational settings (such as default settings) for the data storage device of a particular host system. For example, a "normal" operating mode for a storage device within a mobile telephone may be different from the "normal" operating mode for a storage device of a desktop or portable computer. The "safe" operating mode may refer to a diagnostic mode of a particular device. The "voice" operating mode refers to a mode for recording audio signals or voice communication where acoustic noise from the hard disc is undesirable, while drive input/output (I/O) performance is less significant. The "audio" operating mode refers to a mode for playback of audio recordings where the I/O performance is more important than that of "voice mode", but acoustic noise from the hard disc is tolerable. The "video" operating mode refers to a mode for playback of audio and video signals, requiring a high input/output (I/O) rate. Further, other operating modes are also contemplated, such as a reliability mode for adjusting spindle speed, sampling rate, seek/settle criteria, buffer size, and other parameters to handle significant external disturbances while maintaining performance.

In a particular embodiment, the trigger can be a measured environmental parameter (such as a shock parameter, a vibration parameter, and the like) received from the one or more environmental sensors 162, a firmware parameter (such as bit error rates, read retry rates, other external or internal disturbance estimates, or any combination thereof) received from one or more firmware sensors 160, a user input (such as a mode selection input) received from a host system 104 via the interface 112, or any combination thereof. In a particular illustrative embodiment, the spindle speed control logic 119 is adapted to selectively adjust a spindle speed of the spindle 157, selectively adjust the size of a data buffer of a solid-state memory (such as a data buffer within the data flash 134), selectively alter a sampling rate associated with the one or more read/write heads 154, or any combination thereof in response to receiving the trigger. In a particular example, the data buffer can include a portion of the solid-state memory (such as the data flash 134) that is allocated for use as a data buffer.

Figure 2:
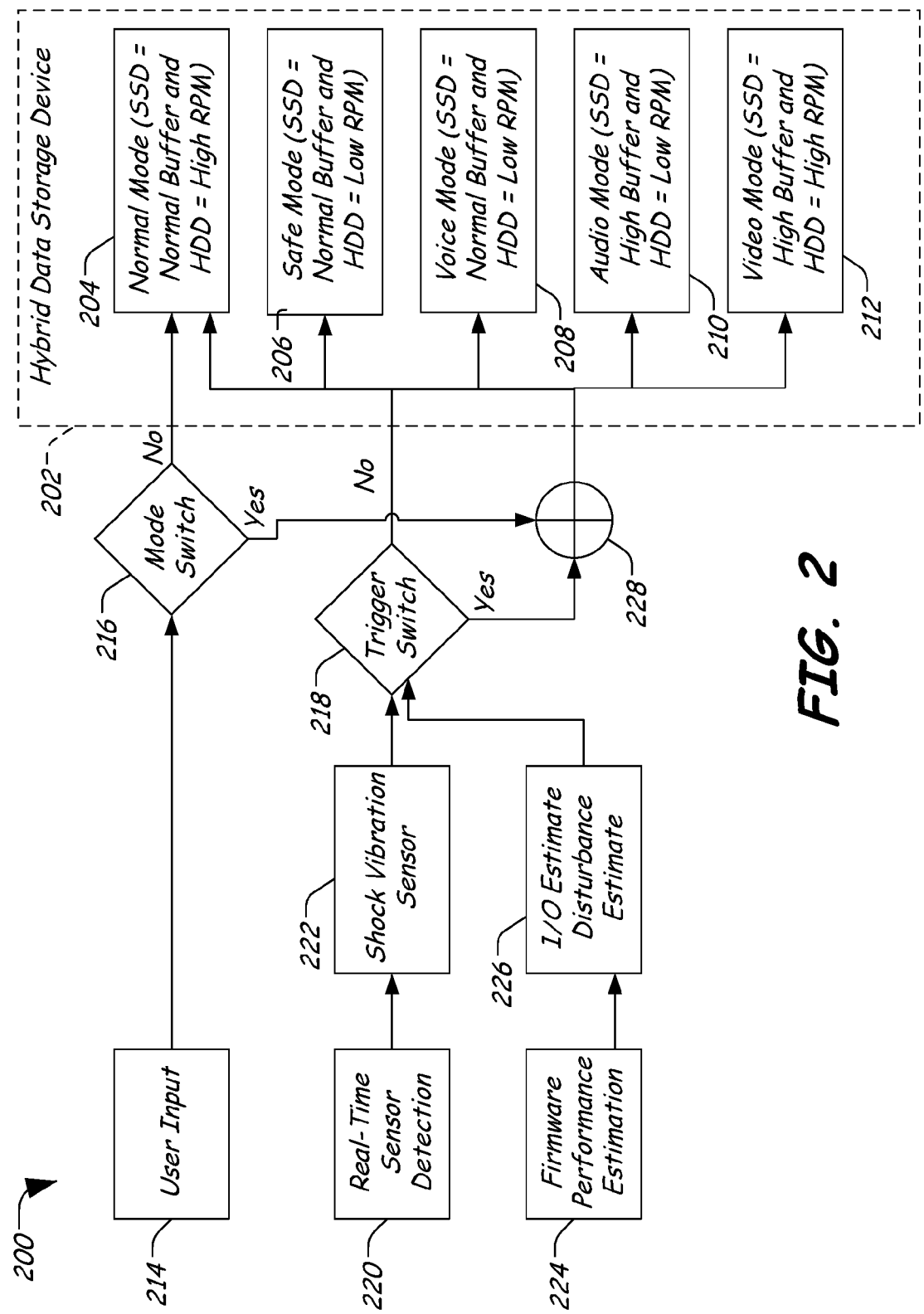
FIG. 2 is a diagram of a method of variable spindle speed control for a hybrid data storage device.

FIG. 2 is a diagram 200 of a method of variable spindle speed control for a hybrid data storage device. The diagram 200 includes a hybrid data storage device 202 having a plurality of operating modes, including a "normal" mode 204, a "safe" mode 206, a "voice" mode 208, an "audio" mode 210, a "video" mode 212, another mode (not shown), or any combination thereof. In a particular embodiment, each of the plurality of operating modes includes a particular spindle speed and a particular data buffer size. Further, each particular spindle speed may have an associated sample rate to read data from and write data to a hard disc data storage medium. In a particular embodiment, the "normal" mode 204 includes a first data buffer size associated with a solid-state data storage medium and a first spindle speed associated with the hard disc data storage medium. The "safe" mode 206 includes the first data buffer size and a second spindle speed, where the second spindle speed is slower than the first spindle speed. In this particular instance, the "safe" mode 206 can be a diagnostic mode that includes a second sampling rate that is slower than a first sampling rate associated with the "normal" mode 204.

In a particular embodiment, the "voice" mode 208 can be used during audio recording or voice communication. The "voice" mode 208 uses the first data buffer size, the second spindle speed and the second sampling rate. Further, the "audio" mode 210 uses a second data buffer size that is larger than the first data buffer size and uses the second spindle speed. In a particular example, the "audio" mode 210 can be used during audio playback to reduce disc-related noise. The "video" mode 212 includes the second data buffer size and the first spindle speed. In a particular embodiment, the "video" mode 212 can utilize a third spindle speed and a third sampling rate that are greater than the first spindle speed and the first sampling rate, providing improved I/O performance.

The diagram 200 further includes a user input 214 that is coupled to the hybrid storage device 202 via a mode switch 216. The mode switch 216 is adapted to enable the "normal" mode 204 directly and to enable the other modes 206, 208, 210, and 212 via a node 228 that is coupled to a trigger switch 218. In a particular embodiment, the mode switch 216, the node 228, and the trigger switch 218 can be logic that is included within a controller, such as the control processor 118 illustrated in FIG. 1. The trigger switch 218 can be responsive to real-time (or near real-time) sensor detection 220, which is coupled to a shock vibration sensor 222 to provide a signal related to external disturbance data to the trigger switch 218. Additionally, firmware performance estimation 224 is coupled to an input/output (I/O) estimate/disturbance estimate module 226, which is coupled to the trigger switch 218. In a particular embodiment, a controller of the hybrid data storage device 202 is adapted to selectively apply one of the "normal" mode 204, the "safe" mode 206, the "voice" mode 208, the "audio" mode 210, and the "video" mode 212 to adjust parameters of the hybrid data storage device 202 in response to a trigger from the mode switch 216, from the trigger switch 218, or any combination thereof.

In a particular example, if the user input 214 does not indicate a change in mode, the controller can selectively apply the "normal" mode 204. If the user input 214 specifies a mode switch at 216, external disturbance data from the shock vibration sensor 222 and I/O estimate/disturbance estimate data from the I/O estimate/disturbance estimate module 226 can be used by the controller to selectively activate one of the plurality of modes. In a first instance, when the disturbance data and the I/O estimate/disturbance estimate data indicate no external disturbance (or external disturbances within an acceptable range), the controller can selectively activate the "normal" mode 204. In a second example, when the disturbance data and the I/O estimate/disturbance estimate data indicate an external disturbance (or an external disturbance that exceeds a threshold), the controller can selectively apply one of the "safe" mode 204, the "voice" mode 208, the "audio" mode 210, and the "video" mode 212 based on the particular trigger.

In a particular embodiment, the variable spindle speed can be used to reduce power consumption, reduce errors and enhance overall reliability. Power consumption by the hybrid data storage device 202 can be measured under different operating conditions, including idle and high input/output operations per second (IOPS). In a particular example, the idle power can be proportional to the rotations per minute squared (rpm$^2$) of the spindle according to the following equation:

$$P_{idle} = K * rpm^2 \quad \text{(Equation 1)}$$

where the variable P represents the power and where K is a constant. In a particular example, if the spindle rotation speed (hereinafter "spindle speed") decreases from 10000 rpm to 7200 rpm, the idle power of a particular embodiment of a hybrid data storage device 202 can be reduced by almost 48%. In an example, the hybrid data storage device 202 includes power savings modes that utilize the lower spindle speeds to reduce power consumption and that utilize an increased data buffer to maintain a consistent input/output performance.

In another particular embodiment, the controller of the hybrid data storage device 202 may be adapted to vary the spindle speed based on real-time (or near real-time) estimates of the external disturbance. In an example, the controller is adapted to selectively adjust the spindle speed to achieve a desired track mis-registration (TMR) reduction. In a particular embodiment, several mechanical contributors operate to limit the tracking TMR, including coil excitation driven hard disc related resonance, spindle/windage driven related disc modes, and windage driven resonance. In a particular example, windage driven resonance can be more than half (50%) of the total non-repeatable runout (NRRO). Reducing the spindle speed (i.e., rpm) can reduce windage driven NRRO. Table 1 below includes data related to two different hard disc drive devices having different outside diameters and different spindle speeds.

TABLE 1

NRRO Comparison Between 15K rpm and 10K rpm

| | First HDD/15K rpm | | | | Second HDD/10K rpm | | | |
|---|---|---|---|---|---|---|---|---|
| | Mean | | Mean + | | | | Mean + | |
| | Micro | % TP | 3 sigma | | Mean | | 3 sigma | |
| NRRO | cro | % TP | Micro | % TP | Micro | % TP | Micro | % TP |
| ID | 0.4 | 5.93 | 0.46 | 6.96 | 0.32 | 4.8 | 0.38 | 5.7 |
| MD | 0.43 | 6.42 | 0.49 | 7.39 | 0.36 | 5.4 | 0.44 | 6.6 |
| OD | 0.51 | 7.66 | 0.67 | 10.08 | 0.45 | 6.75 | 0.56 | 8.4 |
| Overall | 0.45 | 6.72 | 0.63 | 9.38 | 0.38 | 5.7 | 0.53 | 7.95 |

As shown in TABLE 1, the second hard disc drive (HDD) had a lower NRRO than the first HDD due to the reduced spindle rotation speed. In particular, the second HDD experienced approximately twenty percent (20%) less windage driven NRRO. Since the second HDD had an outside diameter (OD) of 65 mm as compared to 54 mm for the first HDD, the first HDD should have twenty percent (20%) more NRRO if the NRRO is proportional to the disc radius or 45% more NRRO if the NRRO is proportional to the square of the disc radius. In other words, the second HDD should have about 33% or 45% less windage, respectively, than the first HDD if the first HDD used the same size disc radius.

Since NRRO dominates the tracking capability of an HDD, tracking of the TMR can be significantly improved after the rpm adjustment. For data storage devices in consumer electronics, varying the spindle speed according to TMR-related errors and adjusting a corresponding sampling rate associated with a read/write head can enhance performance, particularly where the disc drive operating conditions can be significantly different on a case-by-case basis. In a particular example, the spindle speed is adjusted when the TMR-related errors exceed a TMR threshold. The TMR threshold may represent a number of TMR related errors at which performance falls below a desired performance level.

Further, in a particular example, hard disc drive read/write performance can be highly dependent upon the servo seek settle parameters. When the external disturbance is high, the amount of seek retries can also increased, which can result in reduced input/output (I/O) performance. In a particular embodiment, the controller is adapted to adjust the spindle speed, the associated sample rate, and associated seek/settle criteria to deliver improved I/O performance. In a particular illustrative example, the controller can selectively adjust the spindle speed and the sample rate to achieve a desired seek/settle track mis-registration (TMR) performance parameter and to deliver improved I/O performance. In certain embodiments a data storage device includes a first data storage medium 134 including a data buffer having a variable buffer size; a second data storage medium 156 adapted to rotate about a spindle; read write circuitry 116 adapted to read data from and write data to at least the second data storage medium 156; and a controller 120 coupled to the read write circuitry 116 and adapted to receive data related to at least one of an external disturbance and a user input. The controller is adapted to selectively vary a spindle speed associated with the spindle in response to the received data to apply a corresponding sample rate to the read write circuitry when the spindle speed is varied; and selectively adjust the variable buffer size in response to the received data. In certain embodiments, the controller 120 is adapted to reduce the spindle speed, reduce the sample rate, and increase the buffer size to reduce overall power consumption.

In consumer electronics applications, the controller can be adapted to adjust the spindle speed for handset devices (personal digital assistants (PDAs) and cell phones) where drive acoustics can be important, such as when the handset device is in a voice communication or voice recording mode. In a particular example, the controller of the hard disc drive can reduce the spindle speed to a relatively low RPM to reduce acoustic noise. In another particular embodiment, the controller of the hard disc drive can adjust the spindle speed based on a particular object, such as an object-oriented spindle speed. Further, the controller can adjust the spindle speed to achieve a desired I/O performance, to achieve a desired power consumption level, to achieve a desired acoustic reduction, or any combination thereof.

In an example, there are technical challenges for spindle speed control including servo control, head fly height control, and resonance waterfall control. In a particular example, the servo delivers a package targeted at a fixed sampling rate corresponding to a constant spindle speed. Further, the slider can be designed to fly properly at the constant spindle speed, and the read/write assembly can be adapted to control resonance under constant spindle speed. In a particular embodiment, the controller is adapted to vary the spindle rate based on a received trigger (and/or according to a selected operating mode). The variable spindle rate leads to variable sampling rates for the digital servo control system. In this example, a system-on-a-chip (SOC) can support complex servo features. Further, multiple sample rate controllers can be pre-designed and saved at the SOC to support the variable spindle speeds. The mode change to switch between the modes 204, 206, 208, 210, and 212 can include varying the spindle speed and applying an associated sample rate. Further, some parameter varying algorithms can also be implemented for such variable spindle rate scenarios. Accordingly, the data buffer size may be adjusted in conjunction with a change in the spindle speed.

In a particular example, the spindle speed may be constrained, in part, by the fly-height characteristics of the slider that bears the read/write head. In a particular embodiment, the slider can maintain proper flight characteristics over a wide range of spindle speeds, and a controller of the data storage device can use different parameters to trigger spindle speed changes. For example, in high vibration/shock environment, the controller of the drive can switch to lower spindle speeds to increase reliability while maintaining performance by expanding the buffer of the solid-state storage media. Data received from vibration sensors or shock sensors and data error information from firmware sensors can be used to trigger the spindle speed change. Further, the spindle rate adjustment can be determined by the input/output (I/O) duty level for power consumption purposes, performance purposes, acoustic purposes, or any combination thereof.

Figure 3:
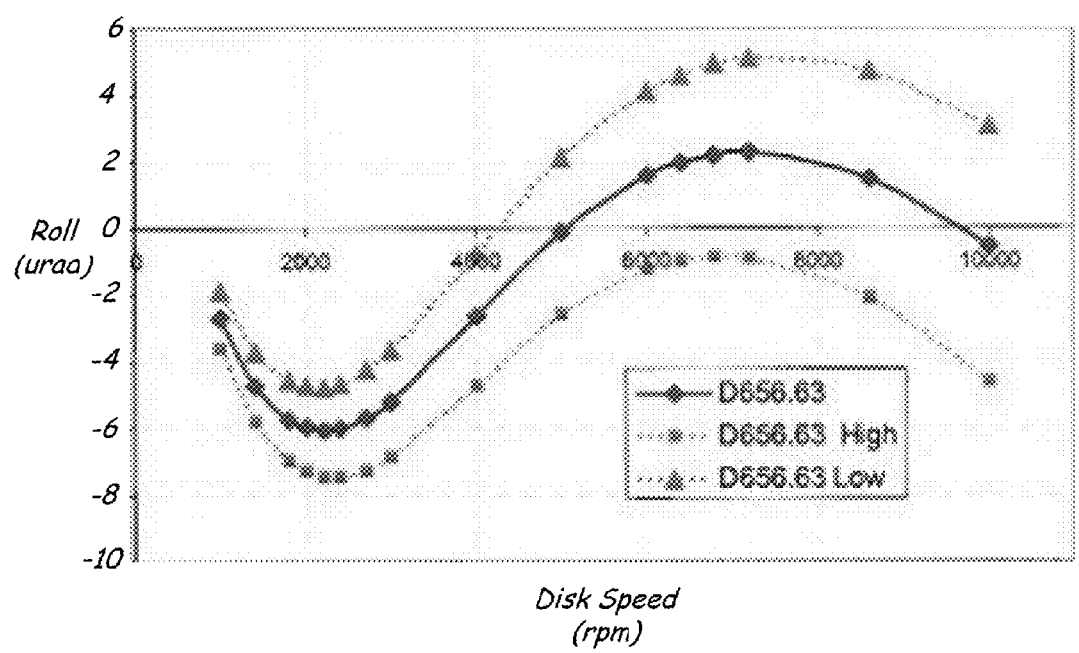
FIG. 3 is a diagram of a particular representative example of roll versus spindle speed for a take-off profile of a slider of a rotatable data storage device over a range of spindle speeds.
Figure 4:
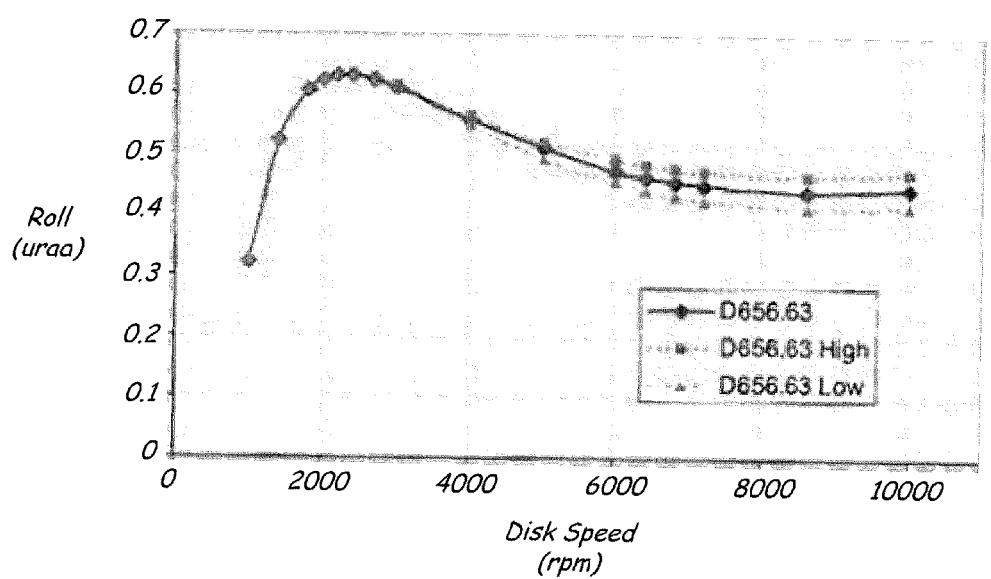
FIG. 4 is a diagram of a particular representative example of fly height versus spindle speed for a take-off profile of the slider of FIG. 3 over a range of spindle speeds.
Figure 5:
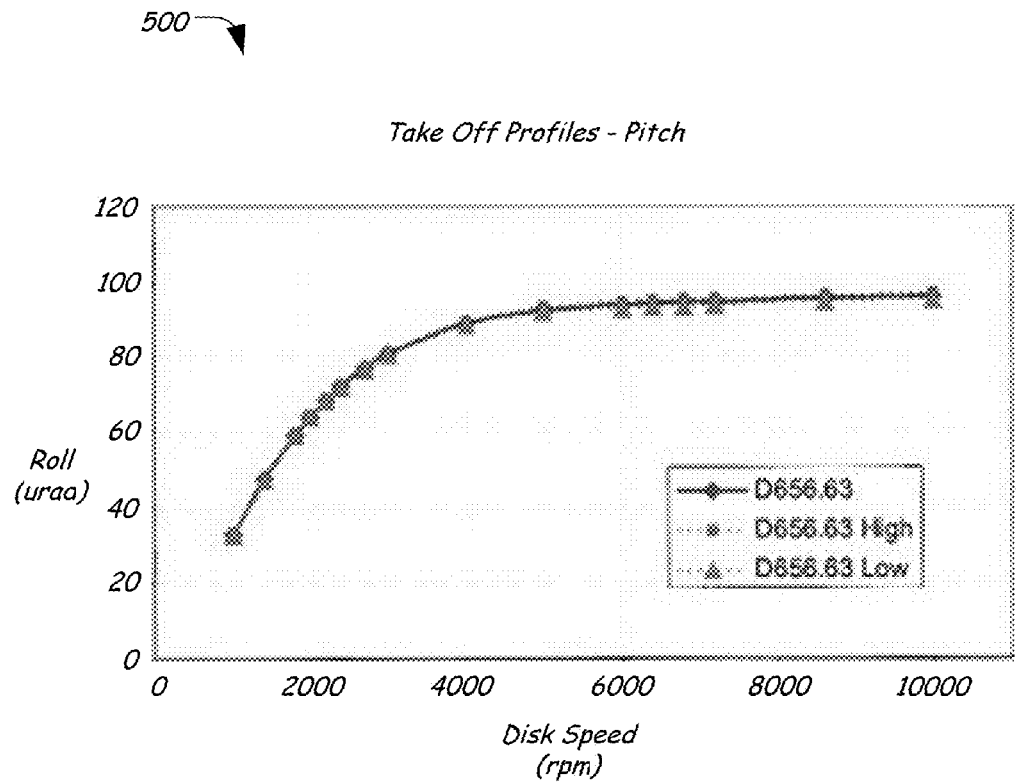
FIG. 5 is a diagram of a particular representative example of pitch versus spindle speed for a take-off profile of the slider of FIG. 3 over a range of spindle speeds.

FIGS. 3-5 demonstrate that a particular embodiment of a slider can function under varying spindle speeds from approximately 6000 RPM to 10000 RPM. In the embodiments of FIGS. 3-5, the data storage device is a contact start/stop (CSS) device.

FIG. 3 is a diagram 300 of a particular representative example of roll versus spindle speed for a take-off profile of a slider of a rotatable data storage device over a range of spindle speeds. The diagram 300 illustrates take-off performance of a particular storage device at a contact start/stop (CSS) zone. As shown, at speeds of about 6000 rpm to 10000 rpm, the roll characteristics of the slider are represented by a relatively smooth curve indicating a slowly changing (controllable) roll characteristic, which can achieve desired roll performance.

FIG. 4 is a diagram 400 of a particular representative example of fly height versus spindle speed for a take-off profile of the slider of FIG. 4 over a range of spindle speeds. Low fly heights have an increased chance of head crashes in the data zone, as compared to greater fly heights. However, AE (acoustic emission) sensors can be used to provide contact detection functionality to improve fly height controls. In a particular example, such AE sensors can provide fly height data that can be used to dynamically adjust fly height parameters associated with a slider to which a read/write head is mounted. In the diagram 400, the fly height is roughly the same between 7200 RPM and 10000 RPM. When the slider (read/write head) flies into an inside diameter (ID) zone of the data storage medium, the flying height can become a little lower, but tests demonstrate that the data storage device can still function properly, even at lower spindle speeds and lower flying heights.

FIG. 5 is a diagram 500 of a particular representative example of pitch versus spindle speed for a take-off profile of the slider of FIG. 3 over a range of spindle speeds. The diagram 500 demonstrates that the slider pitch stabilizes at about 6000 RPM, such that over a range from about 5000 RPM to 10000 RPM, the pitch of the slider remains substantially constant.

In the embodiments of FIGS. 3-5, the particular data storage device is a contact start/stop (CSS) data storage device. However, for a load-unload drive, the flying height control is different, since the slider flies in the outside diameter (OD) zone of the data storage medium. In this instance, the fly height control sometimes favors low spindle speed for head load/unload because of the ramp/unramp contact challenges.

Figure 6:
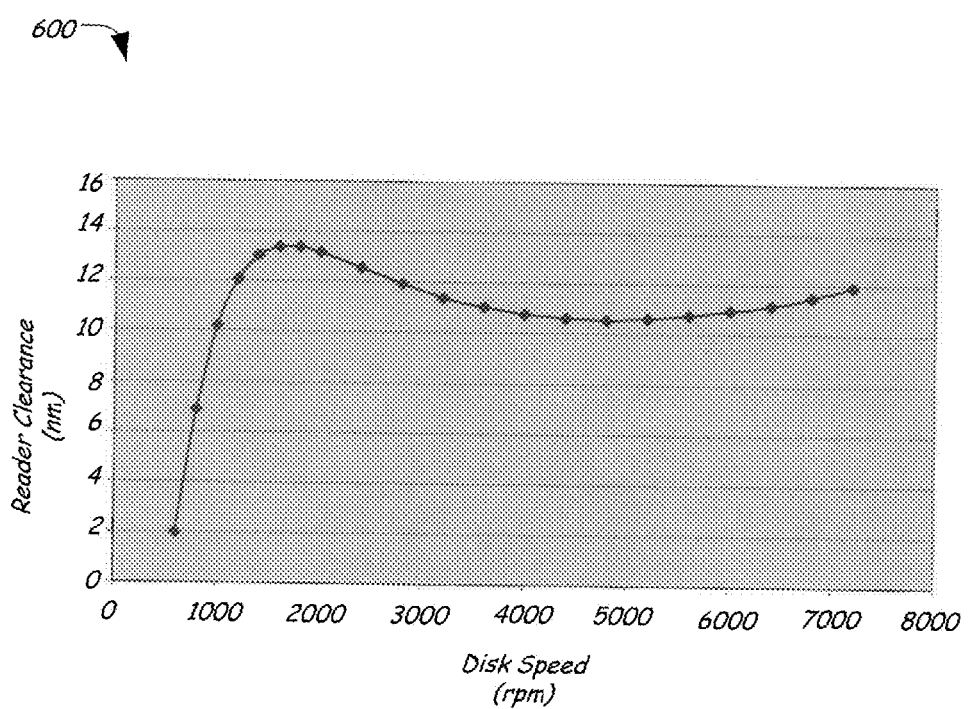
FIG. 6 is a diagram of a second particular representative example of fly height versus spindle speed at an outside diameter of the rotatable storage medium for a slider of a load-unload drive.

FIG. 6 is a diagram 600 of a second particular representative example of fly height versus spindle speed at an outside diameter of the rotatable storage medium for a slider of a load-unload drive. In this particular instance, the data storage device was designed to operate at approximately 7200 RPM. However, the fly height remains substantially stable over a range of approximately 3000 RPM to 7200 RPM. Accordingly, varying of the spindle speed and operating using different sample rates can function with existing OD data storage devices.

It should be understood that the graphs of FIGS. 3-7 are provided for illustrative purposes, and are not intended to be limiting. Further, it should be understood that the sliders and the fly height controls can be modified to maintain a substantially constant fly height over a wide range of spindle speeds, allowing for a high degree of granularity with respect to the number of different spindle speeds and data sampling rates that can be applied to a particular data storage device.

Figure 7:
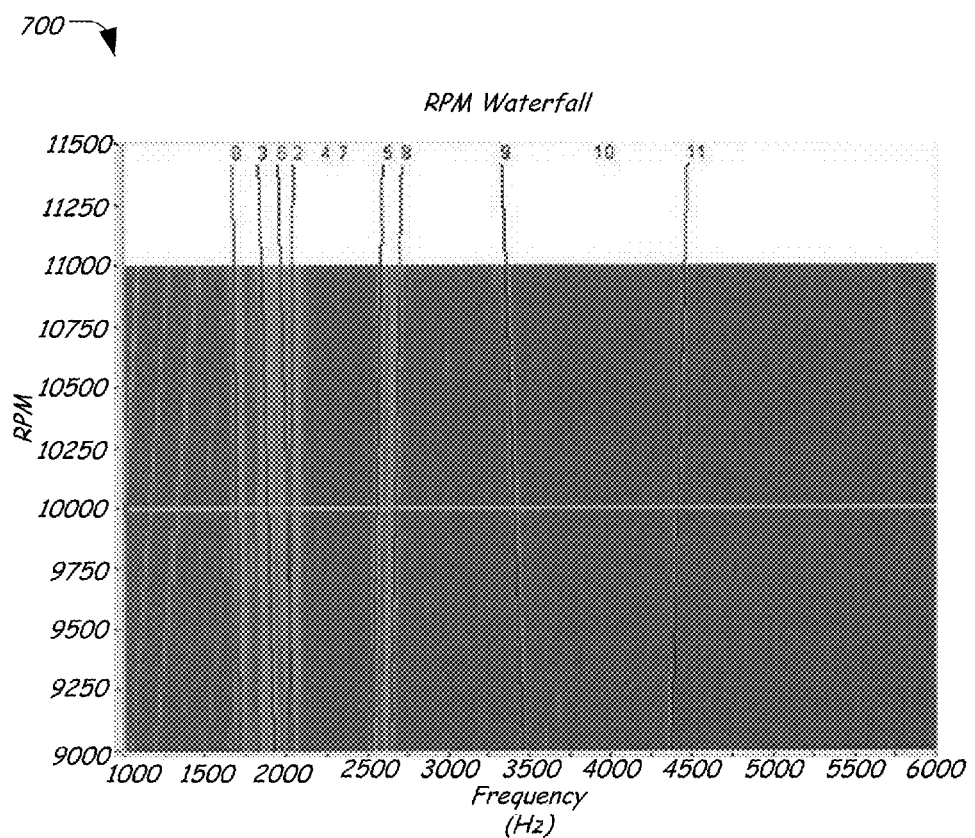
FIG. 7 is a diagram of rotations per minute (RPM) versus frequency for a representative rotatable storage medium having variable spindle speeds illustrating no significant resonance coupling due to thermal cycling and spindle speed switching.

FIG. 7 is a diagram 700 of temperature versus frequency for a representative rotatable storage medium having variable spindle speeds illustrating no significant resonance coupling due to thermal cycling and spindle speed switching. In a particular example, disc modes change with varying spindle rotation speeds. Other modes in the data storage device may be checked at different temperatures to confirm that there is no significant resonance coupling. If the data storage device has a limited number of spindle speeds, the mechanical features of the read/write circuitry can be designed to limit resonance coupling due to thermal cycling and spindle speed switching. In a particular embodiment, the mechanical features of the read/write circuitry can be designed to limit resonance coupling over a desired range of spindle speeds.

Figure 8:
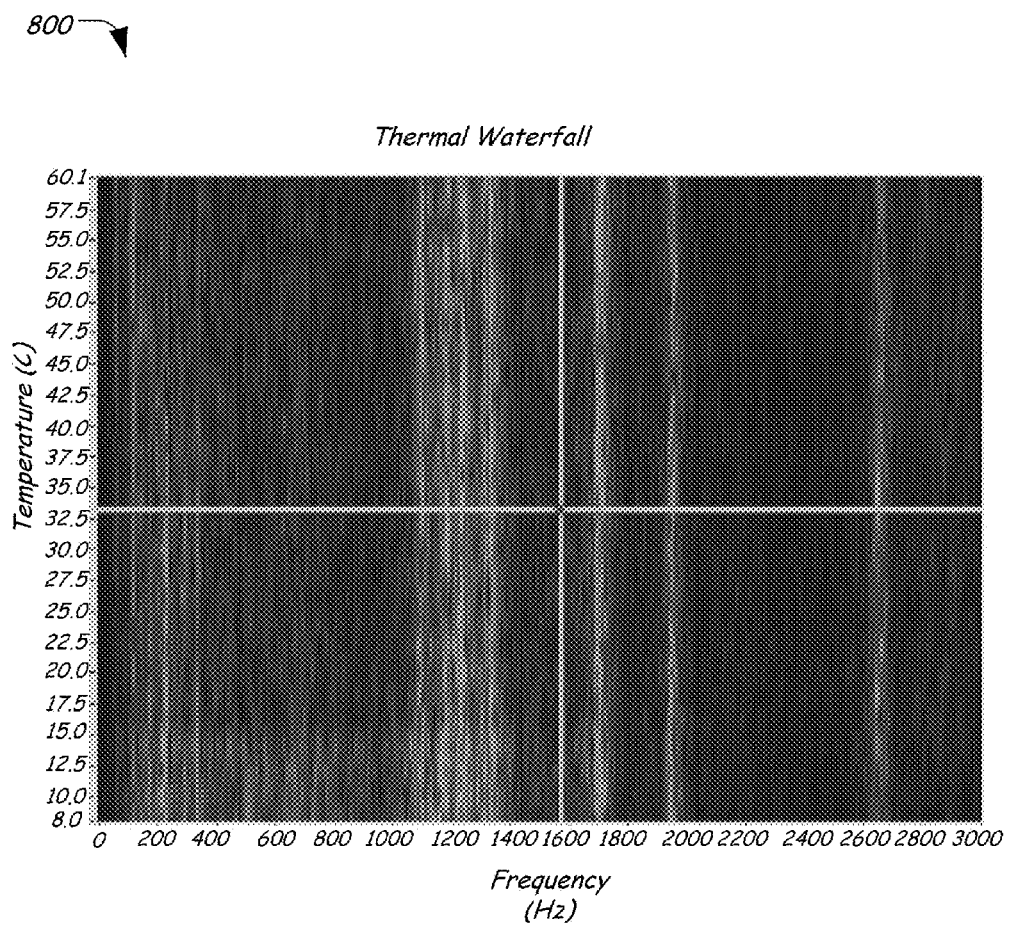
FIG. 8 is a diagram of disc mode versus temperature for a representative rotatable storage medium illustrating no significant resonance coupling due to thermal cycling at a fixed spindle speed.

FIG. 8 is a diagram 800 of disc mode versus temperature for a representative rotatable storage medium illustrating no significant resonance coupling due to thermal cycling at a fixed spindle speed. In a particular embodiment, if the disc mode frequency does not change with temperature, then resonance is less of an issue for the servo. However, by comparing the RPM waterfall of FIG. 7 and the thermal waterfall of FIG. 8 against other sources of resonance (such as actuator arm modes including arm bending, torsion, and other modes), such sources of resonance coupling can be reduced or eliminated.

In a particular example, a data storage device can be configured to switch between two different operating spindle speeds, including a high RPM mode and low RPM mode. The RPM waterfall can be used to identify the disc mode frequencies at different RPM. Then, at each RPM, a thermal waterfall test can be performed to identify variations. Further, in conjunction with the RPM and thermal waterfall tests, other modes can be identified via laser scanning or other testing techniques to check for resonance coupling and to identify sources of such coupling. Once the sources are identified, the design can be adjusted to reduce the coupling, such as by changing the frequencies of the low/high RPM modes, by altering other design features, or any combination thereof.

It should be understood that the controller of the data storage device may be adapted to select a spindle speed from a plurality of spindle speeds and to apply the selected spindle speed to a spindle coupled to a disc data storage medium. In this instance, the controller can be adapted to selectively apply any number of spindle speeds. Further, the controller is adapted to apply an sample rate related to the selected spindle speed, and to selectively adjust a size of a buffer (which may be an allocated portion of a non-volatile memory) within a solid-state data storage medium.

Figure 9:
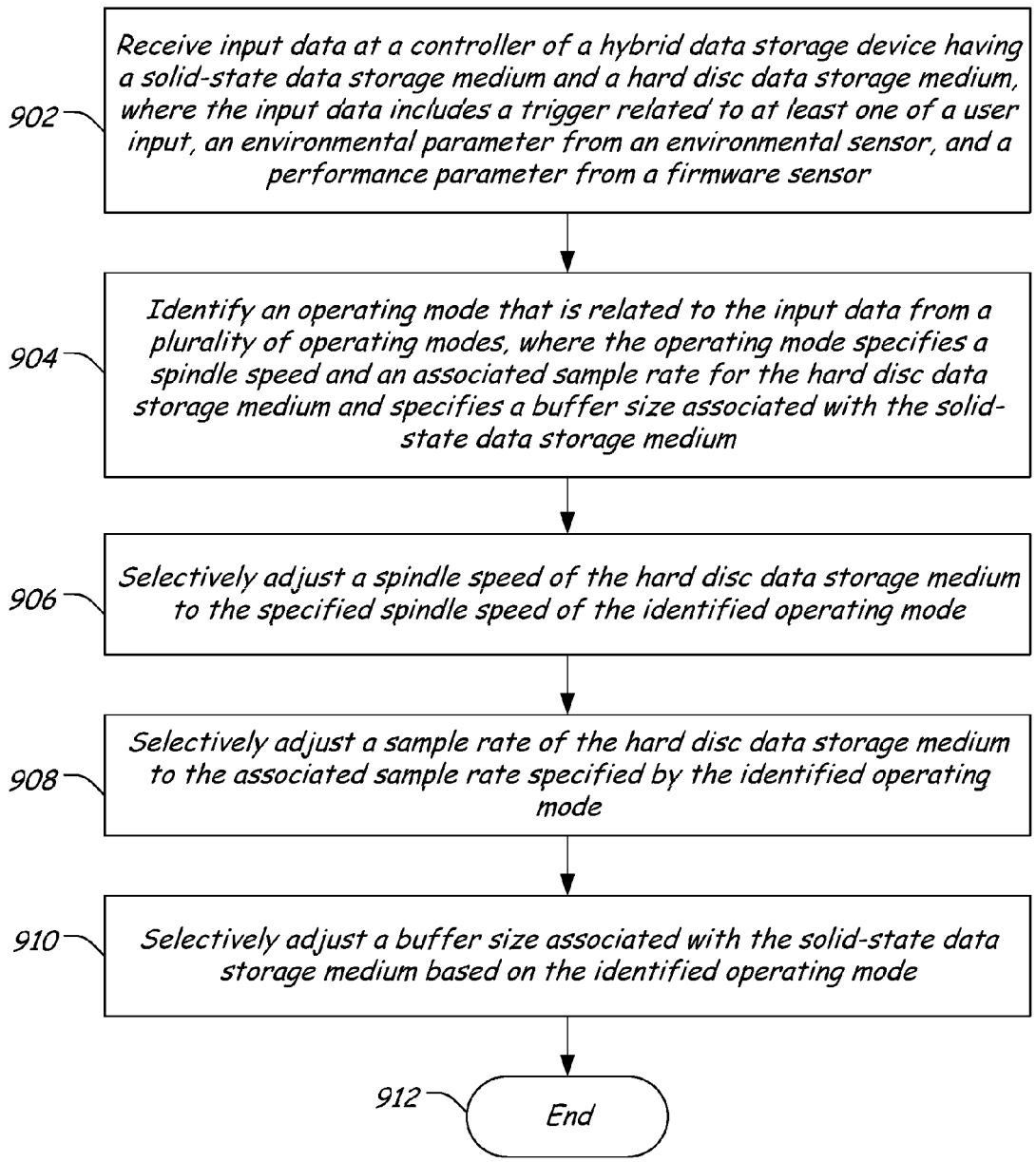
FIG. 9 is a flow diagram of a particular illustrative embodiment of a method of varying a spindle speed of a rotatable storage medium of a hybrid data storage device.

FIG. 9 is a flow diagram of a particular illustrative embodiment of a method of varying a spindle speed of a rotatable storage medium of a hybrid data storage device. At 902, input data is received at a controller of a hybrid data storage device having a solid-state data storage medium and a hard disc data storage medium, where the input data includes a trigger related to at least one of a user input, an environmental parameter from an environmental sensor, and a performance parameter from a firmware sensor. In a particular embodiment, the user input can be a mode selection, such as a user selected "safe" mode, a user selected "audio" mode, a user selected "voice" mode, or any combination thereof. In a particular example, the hybrid data storage device may include a software interface accessible to a user to configure the hybrid data storage device for operation in a particular operating mode. Further, the hybrid storage device can include environmental sensors adapted to detect vibrations, shock events, and other external disturbances and to generate a signal including an environmental parameter representative of such external disturbances that can be received at the controller. Additionally, the hybrid storage device can include firmware sensors to monitor performance parameters, such as bit error rates, read retry rates, other performance data, or any combination thereof, and to generate a signal including performance parameter data that can be received at the controller.

Advancing to 904, an operating mode is identified that is related to the input data from a plurality of operating modes, where the operating mode specifies a spindle speed and an associated sample rate for the hard disc data storage medium and specifies a buffer size associated with the solid-state data storage medium. In a particular embodiment, the controller of the storage device uses the input data (the user input, the environmental parameter, the performance parameter data, or any combination thereof) to identify an operating mode based on the input data. In a particular example, the operating mode may be selected based on the received data.

Continuing to 906, a spindle speed of the hard disc data storage medium is selectively adjusted to the specified spindle speed of the identified operating mode. The spindle speed may be increased, decreased, or left unchanged depending on the identified operating mode. Proceeding to 908, a sample rate of the hard disc data storage medium is selectively adjusted to the associated sample rate specified by the identified operating mode. In this embodiment, the sample rate may vary when the spindle speed is changed. Moving to 910, a buffer size associated with the solid-state data storage medium is selectively adjusted based on the identified operating mode. In a particular example, the buffer size may be increased, decreased or left unchanged depending on the particular operating mode. The method terminates at 912.

In conjunction with the systems and methods disclosed above with respect to FIGS. 1-8, a hybrid data storage device is disclosed that has a solid-state data storage medium and a rotatable disc data storage medium. The hybrid data storage device further includes a controller that is adapted to receive at least one of a user input, an environmental data input, and a performance input. The controller is adapted to selectively activate an operating mode from a plurality of operating modes, where each operating mode specifies a spindle speed and an associated sample rate for the rotatable disc data storage medium and specifies a data buffer size for the solid-state data storage medium. In a particular embodiment, the controller may also configure a caching policy and/or a memory partitioning parameter to adjust how received data is allocated between the solid-state data storage medium and the rotatable disc data storage medium.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the hybrid data storage system while maintaining substantially the same functionality without departing from the scope and spirit of the present invention. In addition, although an embodiment described herein is directed to a hybrid data storage system including a controller adapted to adjust a spindle speed and an associated sample rate related to a hard disc data storage medium and to adjust a data buffer size associated with a solid-state data storage medium, it will be appreciated by those skilled in the art that the teachings of the present invention can be applied to other hard disc drive systems, without departing from the scope and spirit of the present invention.

What is claimed is:

1. A data storage device comprising:
    a first data storage medium including a data buffer having a variable buffer size;
    a second data storage medium adapted to rotate about a spindle;
    read/write circuitry adapted to read data from and write data to at least the second data storage medium;
    a controller coupled to the read/write circuitry and adapted to:
        selectively vary a spindle speed associated with the spindle in response to received data,
        apply a corresponding sample rate to the read/write circuitry when the spindle speed is varied,
        selectively adjust the variable buffer size in response to the received data, and
        select an operating mode from a plurality of operating modes based on the received data, wherein at least one of the operating modes comprises reducing the spindle speed, reducing the sample rate, increasing the buffer size, and altering a memory partitioning parameter associated with the first data storage medium to utilize the increase of the buffer size.

2. The data storage device of claim 1, further comprising:
    an environmental sensor to measure an external disturbance and to generate a disturbance signal related to the external disturbance to the controller; and
    a firmware sensor to measure performance parameters associated with at least one of the first and second data storage media and to generate a performance signal related to the performance parameters to the controller;
    wherein the received data comprises at least one of an input from a host, the disturbance signal, and the performance signal.

3. The data storage device of claim 2, further comprising an interface responsive to a host system to receive the input from the host.

4. The data storage device of claim 1, further comprising a plurality of operating modes, each operating mode setting a pre-determined spindle speed associated with the second data storage medium and a pre-determined data buffer size associated with the first data storage medium.

5. The data storage device of claim 4, wherein the plurality of operating modes comprises:
    a first operating mode having a first spindle speed and a first data buffer size;
    a second operating mode having a second spindle speed and the first data buffer size;
    a third operating mode having the second spindle speed and a second data buffer size; and
    a fourth operating mode having the first spindle speed and the second data buffer size.

6. The data storage device of claim 5, wherein the first spindle speed is greater than the second spindle speed, and wherein the first data buffer size is smaller than the second data buffer size.

7. The data storage device of claim 1, further comprising:
    a spindle coupled to the second data storage medium; and
    a spindle motor coupled to the spindle and responsive to the controller to vary the spindle speed of the spindle.

8. The data storage device of claim 1, wherein the controller is further adapted to reduce the spindle speed and reduce the sample rate, while reducing overall power consumption when a specific operating mode is selected.

* * * * *